(12) United States Patent
Eshghi et al.

(10) Patent No.: US 11,928,425 B2
(45) Date of Patent: Mar. 12, 2024

(54) FORM AND TEMPLATE DETECTION

(71) Applicant: Box, Inc., Redwood City, CA (US)

(72) Inventors: Kave Eshghi, Los Altos, CA (US);
Victor De Vansa Vikramaratne, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 146 days.

(21) Appl. No.: 16/948,831

(22) Filed: Oct. 1, 2020

(65) Prior Publication Data

US 2022/0108065 A1   Apr. 7, 2022

(51) Int. Cl.
*G06F 40/186* (2020.01)
*G06F 16/14* (2019.01)
*G06F 16/16* (2019.01)

(52) U.S. Cl.
CPC .......... *G06F 40/186* (2020.01); *G06F 16/14* (2019.01); *G06F 16/164* (2019.01)

(58) Field of Classification Search
CPC ....... G06F 40/186; G06F 16/164; G06F 16/14
See application file for complete search history.

(56) References Cited

U.S. PATENT DOCUMENTS

| | | | |
|---|---|---|---|
| 10,657,286 B2 | 5/2020 | Nambiar et al. | |
| 2008/0114750 A1* | 5/2008 | Saxena | G06F 16/3346 707/999.005 |
| 2017/0220545 A1* | 8/2017 | Gururajan | G06F 40/106 |
| 2018/0232658 A1* | 8/2018 | Acharya | G06Q 30/0201 |
| 2020/0218761 A1* | 7/2020 | Roberts | G06F 16/353 |

OTHER PUBLICATIONS

Smith, L., "User Considerations When Applying Machine Learning Technology To Accounting Tasks," Copyright © 2018 Stellenbosch University.
"Popular Unsupervised Clustering Algorithms," Kaggle, dated 2019.
"Azure Form Recognizer documentation," Microsoft, dated via Internet Archives Sep. 28, 2021, URL: https://docs.microsoft.com/en-us/azure/cognitive-services/form-recognizer/.

(Continued)

*Primary Examiner* — Hosain T Alam
*Assistant Examiner* — Anthony G Gemignani
(74) *Attorney, Agent, or Firm* — Vista IP Law Group, LLP

(57) ABSTRACT

Methods, systems and computer program products for content management systems. A content management system is configured to manage a plurality of content objects. Unsupervised learning is performed over the plurality of content objects to identify document templates associated with content objects taken from the plurality of content objects. When a document template is identified, template metadata is associated with the document template. Additional content objects that are similar to the document template can take on the template metadata. In this way, many documents can be automatically populated with template metadata that corresponds to the identified document template. All or portions of the template metadata can be applied to policies, which policies serve to marshal ongoing document handling operations. During learning, document features are extracted and analyzed so as to define feature clusters, which feature clusters are in turn are used to form document template clusters.

20 Claims, 12 Drawing Sheets

(56) References Cited

OTHER PUBLICATIONS

Villalobos, N., "Success Story: OnGuard Integrates Leadtools OCR and Data Extraction Libraries to Recognize a Multitude of File Types," LeadTools Blog, dated Jun. 11, 2020.
Palande, C., "Anonymizing Data to Showcase Machine Learning Solutions," Opex Analytics, dated Feb. 21, 2020, URL: https://medium.com/opex-analytics/anonymizing-data-to-showcase-machine-learning-solutions-f159b833c72.
"Parascript® FormXtra.AI® Capture," Copyright 2020, Parascript Management, Inc.
Villalobos, N., "Tutorial: Auto Recognize and Process a Form," Leadtools Blog, dated Apr. 24, 2020, URL: https://www.leadtools.com/blog/document-imaging/forms-recognition-processing/tutorial-auto-recognize-process-form/.
Haiby, N., "Beyond the printed form: Unlocking insights from documents with Form Recognizer," Azure, dated Sep. 3, 2019, URL: https://azure.microsoft.com/en-us/blog/beyond-the-printed-form-unlocking-insights-from-documents-with-form-recognizer/.
Haiby, N., "New features for Form Recognizer now available," Azure, dated Mar. 17, 2020, URL: https://azure.microsoft.com/en-us/blog/new-features-for-form-recognizer-now-available/.
Ba, "How to automate form processing with Azure Form Recognizer," dated Oct. 22, 2020, URL: https://cloudblogs.microsoft.com/industry-blog/en-gb/technetuk/2020/10/22/how-to-automate-forms-processing-with-azure-form-recognizer/.

\* cited by examiner

FORM AND TEMPLATE DETECTION

TECHNICAL FIELD

This disclosure relates to content management systems, and more particularly to techniques for form and template detection.

BACKGROUND

Cloud-based content management services and systems have impacted the way personal and enterprise computer-readable content objects (e.g., files, documents, spreadsheets, images, programming code files, etc.) are stored, and has also impacted the way such personal and enterprise content objects are shared and managed. Content management systems provide the ability to securely share large volumes of content objects among trusted users (e.g., collaborators) on a variety of user devices such as mobile phones, tablets, laptop computers, desktop computers, and/ or other devices. Modern content management systems host many thousands or, in some cases, millions of content objects.

One advance of such content management systems over legacy file systems is the association of extendible sets of metadata with each file. Such metadata might be used to associate one or more rules and/or policies that determine how a content object is accessed, shared, or stored. For example, a content object might be associated with metadata that indicates that the content object is deemed to be "confidential", or that a content object contains personally-identifiable information, or that a content object belongs to a particular organization or group within the organization. The metadata that is associated with such content objects might have been added at the time of creation within the content management system (e.g., via user entry at the time of creation) or might have been added or updated at the time of some event that occurred after creation of the content object (e.g., if some or all of the contents of a newly-entered item is deemed to be "confidential"). The value or values of such metadata are used by the content management system for many purposes, including provisioning access to files in accordance with a security policy, or retaining or deleting files in accordance with an information life cycle policy.

As new users, groups, divisions, enterprises, and/or other entities are onboarded to a content management system, situations often arise where a large number of files are lacking the aforementioned metadata. For example, a new corpus of files created on a legacy file system may be uploaded to a content management system in response to a new group being added to an enterprise account. In this case, if the uploaded files do not have the aforementioned metadata, they cannot be handled in accordance with the policies of the content management system.

One approach to this problem is to manually process each file by administrative actions. Another approach is to quarantine the files in the content management system until such time as some interaction adds metadata to the file or files. These legacy approaches are either unduly labor intensive and/or are error prone, or unwantedly limit the utility of the content management system.

As an observation, a large percentage of files in use by various organizations are instances of documents that are similarly structured. In some cases, the files are instances of rigidly structured documents such as fillable PDFs or HTML forms. For example, an organization that sells a product might have many instances of sales orders that are instances of a sales order form. In other cases, the files are not forms per se but, rather, are instances of documents that share structural similarities. As an example, an organization that publishes content might have many instances of documents that correspond to, for example, product reviews, video clip narrations, recipes, etc., any of which correspond to a respective document structure for describing a product review, a video clip narration, a recipe, etc. The aforementioned forms or document structures can be referred to as "document templates". As such, if a particular file were to be classified as being an instance of, or corresponding to, a particular document template, then at least some of the metadata for that particular file can be automatically added or updated based on a set of metadata that has been determined relevant to the document template.

Unfortunately, there are no known techniques for unsupervised identification of document templates from a corpus of content objects. Certain approaches rely on pre-defined document templates and/or structure attributes (e.g., metadata)—such as pre-existing unfilled forms, template identifiers, etc.—to classify the respective structures of content objects. However, in the absence of such pre-defined structure attributes, these approaches fail to classify the content objects according to their structural characteristics. What is needed is a way to classify the structures of a wide range of content objects in the absence of pre-defined structural attributes.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for form and template detection, which techniques advance the relevant technologies to address technological issues with legacy approaches. More specifically, the present disclosure describes techniques used in systems, methods, and in computer program products for unsupervised learning to accomplish automatic form and template detection. Certain embodiments are directed to technological solutions for analyzing the features of incoming content objects to match to machine-learned features that define a document template.

The disclosed embodiments modify and improve over legacy approaches. In particular, the herein-disclosed techniques provide technical solutions that address the technical problems attendant to classifying content objects as corresponding to a particular machine-learned document template. Such technical solutions involve specific implementations (i.e., data organization, data communication paths, module-to-module interrelationships, etc.) that relate to the software arts for improving computer functionality.

Many of the herein-disclosed embodiments for analyzing the features of incoming content objects to match to machine-learned features that define a document template are technological solutions pertaining to technological problems that arise in the hardware and software arts that underlie content management systems. Aspects of the present disclosure achieve performance and other improvements in peripheral technical fields including, but not limited to, high-performance data cleaning and unsupervised machine learning.

Some embodiments include a sequence of instructions that are stored on a non-transitory computer readable medium. Such a sequence of instructions, when stored in memory and executed by one or more processors, cause the one or more processors to perform a set of acts for analyzing the features of incoming content objects to match to machine-learned features that define a document template.

Some embodiments include the aforementioned sequence of instructions that are stored in a memory, which memory is interfaced to one or more processors such that the one or more processors can execute the sequence of instructions to cause the one or more processors to implement acts for analyzing the features of incoming content objects to match to machine-learned features that define a document template.

In various embodiments, any combinations of any of the above can be combined to perform any variations of acts for form and template detection, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
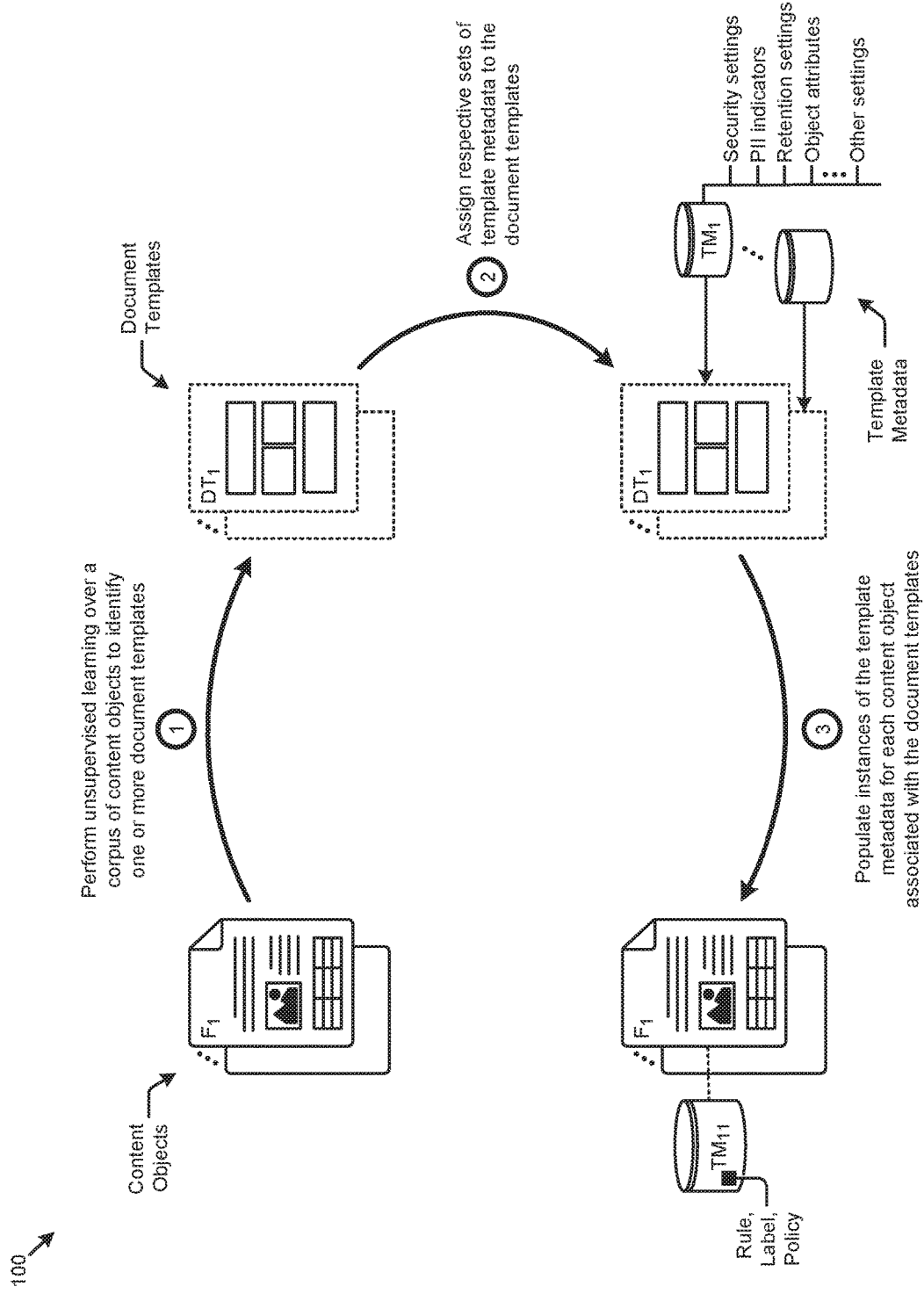
FIG. 1A and FIG. 1B illustrate a computing environment in which embodiments of the present disclosure can be implemented.

Aspects of the present disclosure solve problems associated with using computer systems for classifying content objects as corresponding to a particular machine-learned document template. These problems are unique to various computer-implemented methods for classifying content objects as corresponding to a particular machine-learned document template in the context of content management systems. Some embodiments are directed to approaches for analyzing the features of incoming content objects to match to machine-learned features that define a document template. The accompanying figures and discussions herein present example environments, systems, methods, and computer program products for form and template detection.

Overview

Disclosed herein are techniques for analyzing the features of content objects to classify the content objects in accordance with their respective structural attributes. In certain embodiments, a corpus of content objects is analyzed to enumerate the respective features of the content objects. The features are distinguishable components of the content objects, such as paragraphs, tables, headers, figures, etc. The features are analyzed to form feature clusters based at least in part on the attributes of the features. For example, the features associated with a particular feature cluster will have attributes that are deemed similar in accordance with a score and/or other metrics. The content objects are then analyzed to form document clusters based at least in part on the feature clusters associated with the content objects.

As an example, the content objects associated with a particular document cluster will have respective sets of features that are deemed similar in accordance with their corresponding feature clusters and/or other metrics (e.g., feature count, sequence, proximity, etc.). A document template is designated for each unique document cluster that comprises a large number (e.g., as determined by a predefined threshold) of content objects. As such, each content object of the corpus of content objects can be matched to a designated document template that had been identified and designated based on structural attributes. In certain embodiments, a respective set of metadata is assigned to each document template and then applied over the content objects that are deemed to correspond to a designated document template. In certain embodiments, the metadata is accessed by the content management system so as to apply one or more policies to the content objects. In certain embodiments, a newly uploaded content object is subjected to analysis for corresponding the newly uploaded content object with a designated document template.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1B:
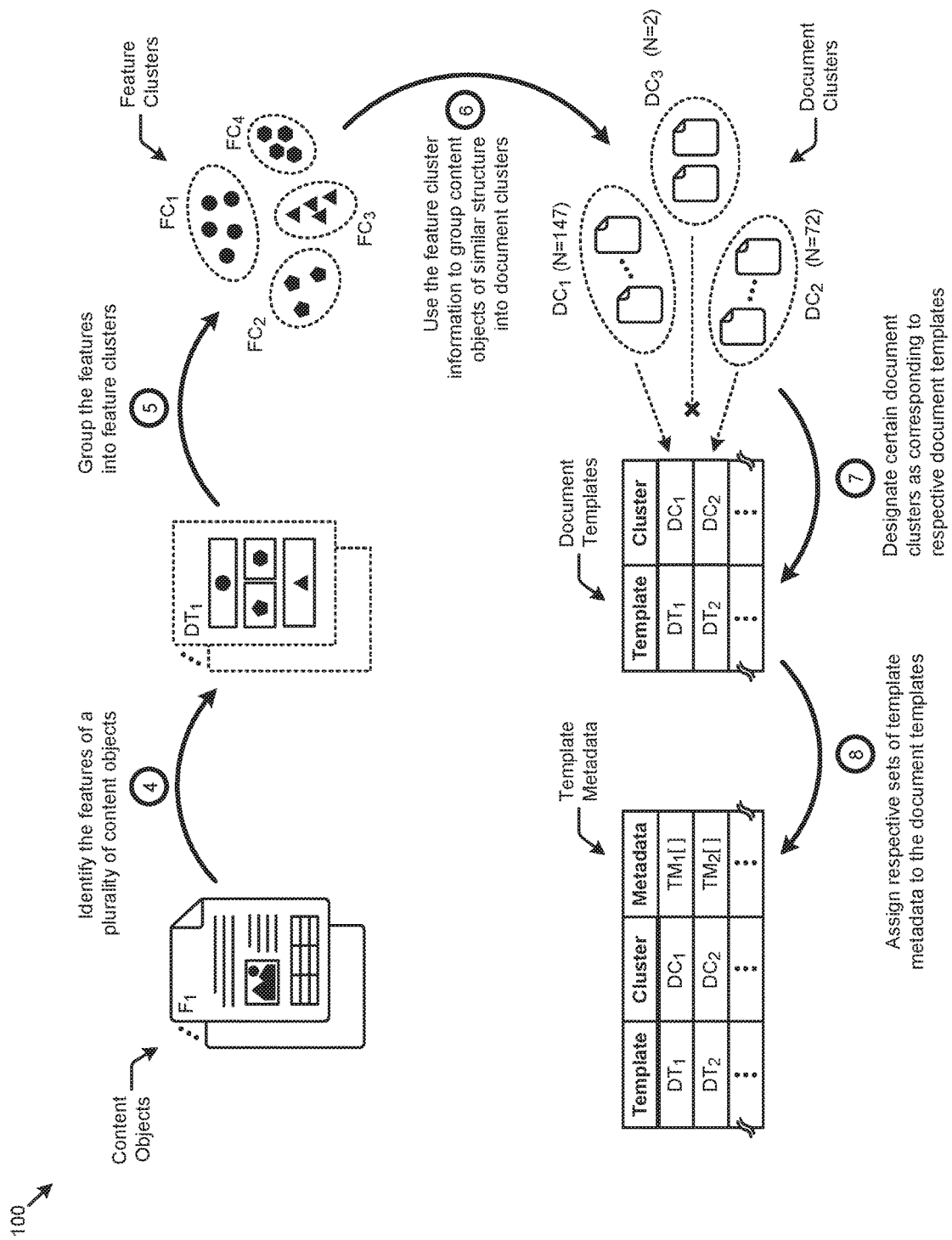

FIG. 1A and FIG. 1B illustrate a computing environment 100 in which embodiments of the present disclosure can be implemented. As an option, one or more variations of computing environment 100 or any aspect thereof may be implemented in the context of the architecture and functionality of the embodiments described herein and/or in any in any environment.

FIG. 1A and FIG. 1B illustrate aspects pertaining to analyzing the features of incoming content objects to match to machine-learned features that define a document template. Specifically, FIG. 1A presents a logical depiction of how the herein disclosed techniques are used to identify document templates and corresponding template metadata that are assigned to the content objects to facilitate handling of content objects in a content management system. Moreover, FIG. 1B presents a logical depiction of how the herein disclosed techniques apply machine learning (e.g., unsupervised clustering) techniques over a plurality of content objects and corresponding content object features to identify document templates and template metadata to associate with the content objects. Representative sets of high order operations are also presented to illustrate how the herein disclosed techniques might be applied in computing environment 100.

Referring to the logical depiction of FIG. 1A, a representative set of content objects (e.g., file $F_1$, etc.) are presented to computing environment 100 (e.g., a content management system). For example, the content objects might be a corpus of documents and files that are onboarded to a content management system in response to a new account being added to the content management system. According to the herein disclosed techniques, unsupervised machine learning is performed over the corpus of content objects to identify one or more document templates associated with the content objects (operation 1). As illustrated, the identified document templates include a document template DT' that has a structure that corresponds to file $F_1$.

Respective sets of template metadata are assigned to the document templates (operation 2). In some cases, the template metadata is configured to facilitate handling of the content objects that are associated with the document templates. For example, template metadata $TM_1$ is assigned to document template $DT_1$ to facilitate handling of content objects that correspond to document template $DT_1$ as pertains to security policies or rules, personally-identifiable information (e.g., PII), retention policies or rules, object sharing attributes, and/or other handling aspects.

Instances of the template metadata are populated for each content object associated with the document templates to facilitate the aforementioned handling (operation 3). As an example, an instance of template metadata $TM_{11}$ that serves as the object metadata for file $F_1$ might indicate a rule (e.g., access to the file is restricted to a particular enterprise or group), or a label (e.g., there is no PII in the file), or a policy (e.g., that the file is to be retained for one year), etc. A content management system can access the object metadata to perform various policy enforcement functions over the file.

Referring to the logical depiction of FIG. 1B, a representative set of content objects (e.g., file $F_1$, etc.) are presented to computing environment 100 (e.g., a content management system). For example, the content objects might be a corpus of documents and files that are onboarded to a content management system in response to a new account being added to the content management system. According to the herein disclosed techniques, unsupervised machine learning is performed over the corpus of content objects to identify the various features associated with the content objects (operation 4). Such features can include paragraphs, images, tables, headers, figures, and/or other structural elements that comprise the content objects. The features may further be distinguished according to other characteristics such as size, length, semantics, and/or other characteristics. In some settings, it happens that a first text passage of a document that has the same set of characteristics of a second text passage actually refer to the same subject matter. This observation can be exploited, at least in that if the characteristics of two text passages are sufficiently the same, then the two passages are deemed to share the same feature, and the two passages can be agglomerated into the same feature cluster.

One or more unsupervised clustering techniques are applied to the identified features to group the features into feature clusters (operation 5). As an example, FIG. 1B illustrates at least four distinct features and corresponding feature clusters (e.g., $FC_1$, $FC_2$, $FC_3$, and $FC_4$) are identified from the content objects.

Information derived from the feature clustering results is used to group content objects into document clusters according to their respective structures (operation 6). As an example, the content objects associated with a particular document cluster will have respective sets of features that are deemed similar in accordance with their corresponding feature clusters and/or other metrics (e.g., feature count, sequence, proximity, etc.).

For illustrative purposes, the content objects are shown as being grouped into three document clusters (e.g., $DC_1$, $DC_2$, and $DC_3$) that each have a different number of constituents (e.g., 147, 72, and 2, respectively). A document template is designated for each unique document cluster that comprises a large number (e.g., as determined by a pre-defined threshold) of content objects (operation 7). As can be observed, document cluster $DC_1$ is designated as corresponding to document template DT' and document cluster $DC_2$ is designated as corresponding to document template $DT_2$. However, document cluster $DC_3$ is not designated as corresponding to a template. In this particular example, document cluster $DC_3$ is not designated as corresponding to any template due to its low number of constituents (e.g., N=2).

To facilitate handling of any content objects that are deemed associated with the document templates, respective sets of template metadata are assigned to the document templates (operation 8). As shown, strictly as an illustrative example, in order to automatically apply metadata, and to facilitate ongoing handling of the content objects in a content management system, template metadata $TM_1$ is assigned to document template DT' and template metadata $TM_2$ is assigned to document template $DT_2$. In this case, instances of template metadata $TM_1$ can be populated for the content objects that comprise document cluster $DC_1$ and instances of template metadata $TM_2$ can be populated for the content objects that comprise document cluster $DC_2$. Incoming documents that match to a document cluster that has been designated as a document template can take on an association with a corresponding metadata template.

One embodiment of techniques for classifying content objects as corresponding to a particular machine-learned document template is disclosed in further detail as follows.

Figure 2:
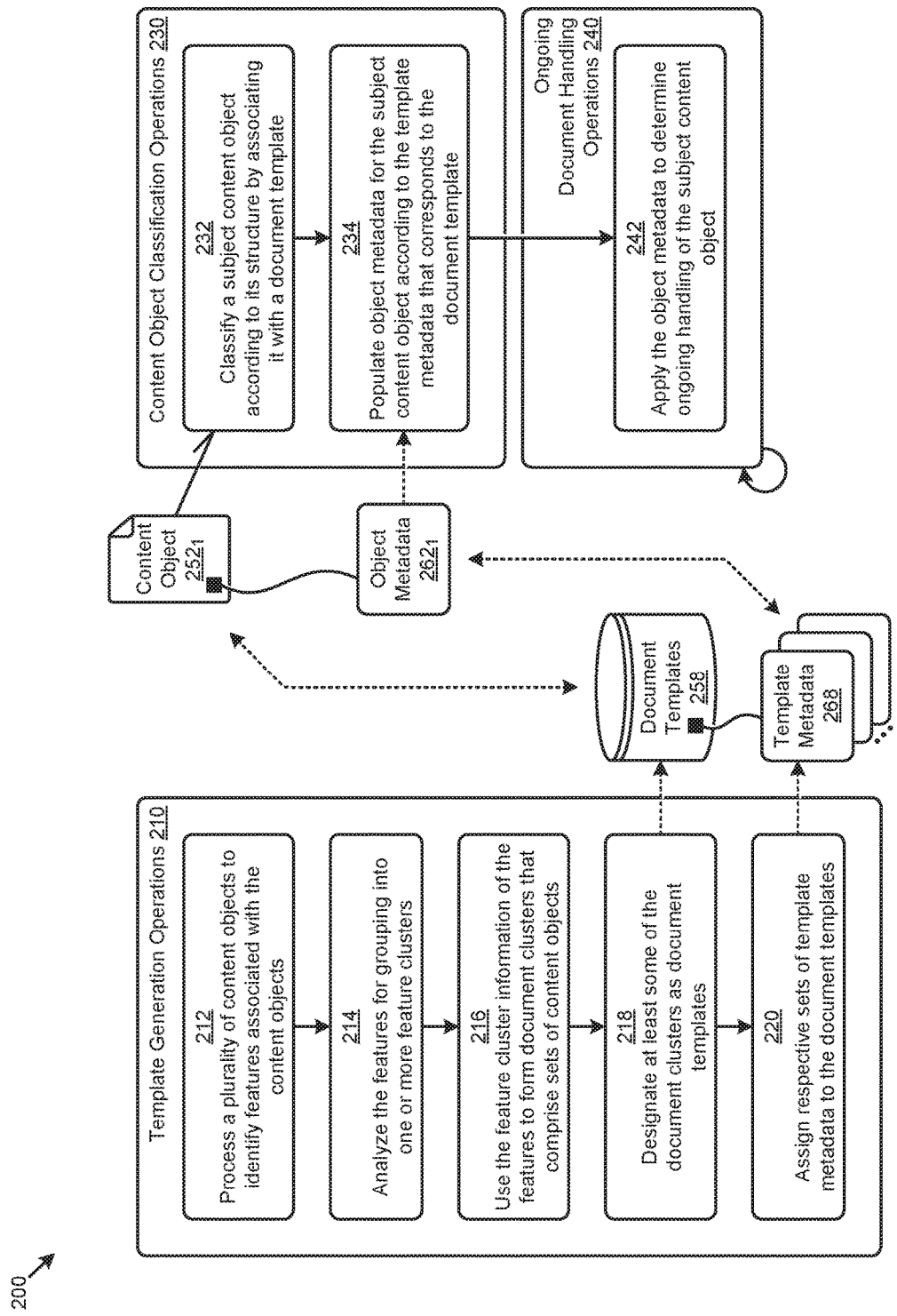
FIG. 2 presents a content object structural classification technique as implemented in systems that detect templates based on structural similarities.

FIG. 2 presents a content object structural classification technique 200 as implemented in systems that detect templates based on structural similarities. As an option, one or more variations of content object structural classification technique 200 or any aspect thereof may be implemented in the context of the architecture and functionality of the embodiments described herein and/or in any in any environment.

FIG. 2 illustrates aspects pertaining to analyzing the features of incoming content objects to match to machine-learned features that define a document template. Specifically, the figure is presented to illustrate one embodiment of certain steps and/or operations performed over a network of devices (e.g., user devices, computing systems, etc.) that apply unsupervised machine learning techniques to identify document templates from a plurality of content objects. The figure further show how to populate metadata of a content object. As used herein, unsupervised machine learning describes a type of machine learning that determines inferences from datasets (e.g., content objects, content object features, etc.) that have no predefined variables or responses to predict. An example of such unsupervised machine learning is a cluster analysis, which is used to find patterns and/or groupings in datasets. As can be observed, the steps and/or operations can be grouped into a set of template generation operations 210, a set of content object classification operations 230, and a set of ongoing document handling operations 240.

Template generation operations 210 of content object structural classification technique 200 commences by processing a plurality of content objects to extract features associated with the content objects (step 212). A feature of a content object is an element of the content object that is distinguishable from other elements in the content object according to structure (e.g., size, length, location, etc.), content type (e.g., text, media, etc.), semantics, and/or other characteristics. The features are analyzed for grouping (e.g., clustering) into one or more feature clusters (step 214). The feature cluster information is used to form document clusters that comprise sets of content objects (step 216). As earlier mentioned, the clustering techniques applied to determine the feature clusters and document clusters are forms of unsupervised machine learning. Further details pertaining to techniques for forming the features clusters and document clusters are disclosed herein.

Certain instances of the document clusters are designated as document templates (step 218). As an example, document clusters that comprise a number of content objects that exceeds a certain threshold (e.g., 20) are designated document templates. As shown, certain attributes associated with each document template might be stored in a set of document templates 258. To facilitate handling of any content objects that are deemed associated with the document templates, respective sets of template metadata are assigned to the document templates (step 220). As shown, for example, sets of template metadata 268 are assigned to respective document templates in document templates 258.

According to content object classification operations 230, a subject content object (e.g., content object $252_1$) is classified according to its structure by associating it with a document template (step 232). As an example, content object $252_1$ may be newly created and/or onboarded in a content management system and is then analyzed to determine if it is structured according to a document template described in document templates 258. If the subject content object is associated with a document template, the object metadata associated with the subject content object is configured and populated according to the template metadata associated with the document template (step 234). As illustrated, a set of object metadata $262_1$ associated with content object $252_1$ is configured and populated according to template metadata 268.

Referring to ongoing document handling operations 240 of content object structural classification technique 200, the object metadata is applied to one or more policies (e.g., established in a content management system) to determine ongoing handling of the subject content object (step 242). For example, such handling might pertain to content object access and/or distribution restrictions based at least in part on ownership and PII indicators recorded in the object metadata.

One embodiment of a system, data flows, and data structures for implementing the content object structural classification technique 200 and/or other herein disclosed techniques, is disclosed as follows.

Figure 3:
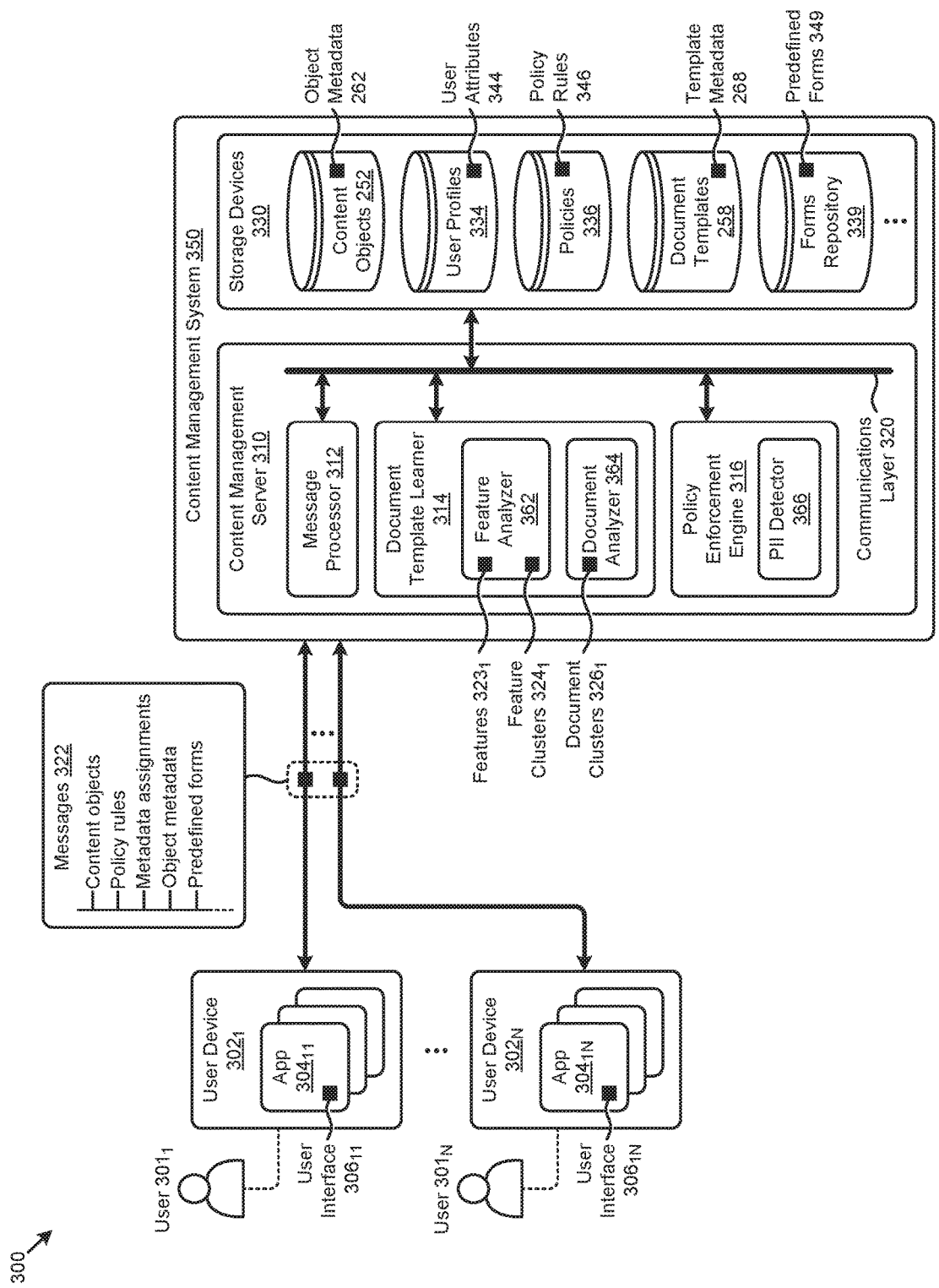
FIG. 3 is a block diagram of a system that implements form and template detection.

FIG. 3 is a block diagram of a system 300 that implements form and template detection. As an option, one or more variations of system 300 or any aspect thereof may be implemented in the context of the architecture and functionality of the embodiments described herein and/or in any in any environment.

FIG. 3 illustrates aspects pertaining to analyzing the features of incoming content objects to match to machine-learned features that define a document template. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $301_1$, ..., user $301_N$) who interact with each other, and who interact with a set of content objects 252 managed at a content management system 350. A content management system manages a plurality of content objects at least in part by maintaining (e.g., storing, updating, resolving interaction conflicts, etc.) the content objects subject to the various interactions performed over the content objects by users. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of content management server 310 operating at content management system 350. Content management server 310 comprises an instance of a message processor 312, an instance of a document template learner 314, and an instance of a policy enforcement engine 316. The document template learner 314 comprises a feature analyzer 362 and a document analyzer 364. The policy enforcement engine 316 comprises a PII detector 366. A plurality of instances of the foregoing components might operate at a plurality of instances of servers (e.g., content management server 310) at content management system 350 and/or any portion of system 300. Such instances can interact with a communications layer 320 to access each other and/or a set of storage devices 330 that store various information to support the operation of the components of system 300 and/or any implementations of the herein disclosed techniques.

Specifically, and as can be observed, the servers and/or storage devices of content management system 350 facilitate interactions over content objects 252 by the users (e.g., user $301_1$, . . . , user $301_N$) from a respective set of user devices (e.g., user device $302_1$, . . . , user device $302_N$). In some cases, such interactions are performed using the respective user interfaces (e.g., user interface $306_{11}$, . . . , user interface $306_{1N}$) of various applications (e.g., app $304_{11}$, app $304_{1N}$) operating on the user devices. User interactions often involve instances of message 322 transferred to and from content management system 350. As can be observed, such messages can pertain to content objects, policy rules, metadata assignments, object metadata, predefined forms, and/or other data objects. The content objects (e.g., files, folders, etc.) in content objects 252 are characterized at least in part by respective sets of object metadata 262 stored at storage devices 330.

Furthermore, the users are characterized at least in part by a set of user attributes 344 stored in a set of user profiles 334 at storage devices 330. Policy enforcement engine 316 applies various instances of policy rules 346 stored in a set of policies 336 for object metadata 262 to manage (e.g., handle) various aspects of the respective content objects associated with the object metadata. As earlier mentioned, challenges can arise with populating such object metadata for newly onboarded content objects.

The herein disclosed techniques address such challenges by analyzing the features of incoming content objects to match to machine-learned features that define one or more document templates. The object metadata for the incoming content objects can then be efficiently populated according to the template metadata associated with the respectively matched document templates. Specifically, according to system 300, a corpus of content objects uploaded to the content management system as instances of messages 322 are received by message processor 312 to be accessed by document template learner 314. Feature analyzer 362 analyzes various instances of features $323_1$ that constitute the content objects to form one or more feature clusters $324_1$ based at least in part on the attributes (e.g., size, content, semantics, structure, arrangement, location, etc.) of features $323_1$. The content objects are analyzed by document analyzer 364 to form one or more document clusters $326_1$ based at least in part on feature clusters $324_1$. As an example, the content objects associated with a particular document cluster will have respective sets of features that are deemed similar in accordance with their corresponding feature clusters and/or other metrics (e.g., feature count, sequence, proximity, etc.). Document analyzer 364 designates certain instances of document clusters $326_1$ as document templates. Attributes that describe each respective document template is stored in document templates 258. Such attributes might describe the configuration, type, content, and/or other attributes pertaining to the features that constitute a particular document template.

In some cases, a document template corresponds to a particular predefined form from a set of predefined forms 349 stored in a forms repository 339 at content management system 350. As an example, a predefined form might be a widely-used publicly available form such as a "Form W-2, Wage and Tax Statement" published by the U.S. Internal Revenue Service. Various techniques can be used to associate a predefined form with a document template. As merely one example, a predefined form can be included in the corpus of content objects that are analyzed so that a document cluster and corresponding document template that includes the predefined form can be identified. Another approach compares a predefined form to existing document templates to identify a document template that has many identical feature characteristics (e.g., form field names, types, sequences, etc.) as compared to the predefined form.

For each document template and/or predefined form a respective set of template metadata 268 is defined. As an example, user $301_1$ might be a system administrator who interacts with user device $302_1$ to establish template metadata that are relevant for each respective document template. In this case, a set of template metadata associated with a document template (e.g., predefined form) that may include PII content (e.g., SSN form field) will include a PII metadata attribute to indicate that a subject content object associated with the document template may include PII. As such, when policy enforcement engine 316 applies the policy rules 346 to the subject content object, the PII metadata attribute from the template metadata will trigger the PII detector 366 to identify any PII content in the subject content object to facilitate handling of the subject content object according to the policy rules.

The foregoing discussions include techniques for processing and analyzing the features of content objects to form feature clusters (e.g., step 212 and step 214 of FIG. 2), which techniques are disclosed in further detail as follows.

Figure 4:
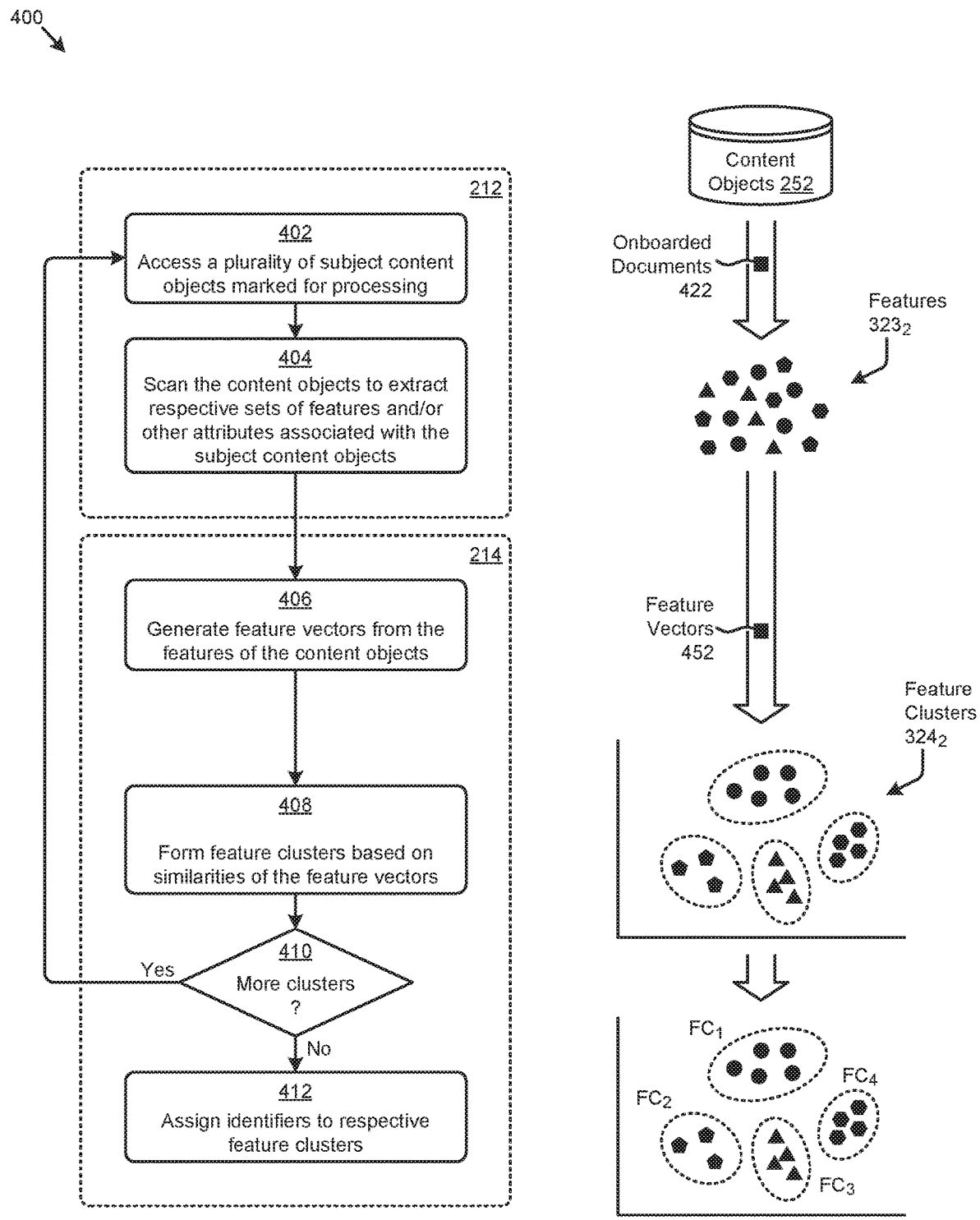
FIG. 4 illustrates a feature clustering technique as implemented in systems for automatic form and template detection.

FIG. 4 illustrates a feature clustering technique 400 as implemented in systems for automatic form and template detection. As an option, one or more variations of feature clustering technique 400 or any aspect thereof may be implemented in the context of the architecture and functionality of the embodiments described herein and/or in any in any environment.

FIG. 4 illustrates aspects pertaining to analyzing the features of incoming content objects to match to machine-learned features that define a document template. Specifically, the figure is presented to illustrate one embodiment of certain steps and/or operations that facilitate processing and analyzing features of content objects to form feature clusters. As depicted in FIG. 4, the steps and/or operations are associated with step 212 and step 214 of FIG. 2. A representative scenario is also shown in FIG. 4 to illustrate an example application of feature clustering technique 400.

Feature clustering technique 400 commences by accessing a plurality of subject content objects that are marked for processing (step 402). As illustrated, for example, a set of onboarded documents 422 from content objects 252 might constitute the subject content objects marked for processing. The subject content objects are then scanned to extract respective sets of features and/or other attributes associated with the content objects (step 404). As can be observed, a set of features $323_2$ are extracted from onboarded documents 422.

Various techniques can be applied to extract features from content objects. For example, many variations of content object conversion tools (e.g., PDF2Text, HTML2Text, etc.) exist to convert certain documents (e.g., PDF files, HTML pages, etc.) to text-based files. Such text-based files facilitate uniform content processing over a wide variety of content object types and structures. Certain versions of content object conversion tools generate highly structured (e.g., XML) text-based files from the original content object. In this case, certain content object attributes (e.g., title, author, create date, keywords, etc.) and feature attributes (e.g., page number, location coordinates, content or data, etc.) are specifically tagged and/or distinguished. As such, the attributes and content associated with each feature (e.g., paragraph, pictures, table, figure, etc.) of a particular content object is identified for feature extraction processing. Strictly as examples, feature extraction may include structural analysis that (for example) detects column headers in a spreadsheet or (for example) detects section headers in a content object. In some cases a topic or summary of a passage is extracted, and aspects of the topic or summary are used as features. In many cases two or more algorithms can be used to extract the topics and/or summaries covered by a passage or passages of a subject content object. In some cases, a single subject content objects may include many structural characteristics, each of which can be associated with a different topic.

The features extracted from the subject content objects are processed to generate a set of respective feature vectors (step 406). The features vectors encode the aforementioned text-based representations of the features into high dimensional vectors that can be used for classifying text, determining semantic similarity, and/or performing other natural language processing tasks. As described herein, the feature vectors specifically facilitate clustering of the features extracted from a set of content objects. Various techniques and tools (e.g., Sent2Vec, Universal Sentence Encoder, etc.) are available to generate such feature vectors. These techniques and tools are designed to handle greater-than-word length text such as sentences, phrases or paragraphs. As illustrated in FIG. 4, a set of feature vectors 452 are generated from features $323_2$.

Step 408 serves to form feature clusters based on similarities of the feature vectors. Strictly as one example, one possible approach having a complexity of order 1 is to identify similarities between feature vectors by using a hashing function to bin feature vectors having the same characteristics into the same hash bin. In some cases a locality sensitive hashing (LSH) algorithm can be used. In other embodiments, a measure of the similarity over the feature vectors (e.g., a cosine similarity) can be pair-wise calculated to form feature clusters that comprise one or more of the features. Examples of other clustering methods include K-Means clustering and Markov clustering. For example, a set of feature clusters $324_2$ are formed from feature vectors 452. Any known machine learning techniques and/or clustering techniques can be applied to the feature vectors to form the clusters. In some cases (e.g., when more computing resources and/or time are available), the generation of more clusters might be performed ("Yes" path of decision 410). Such additional clusters might be generated from an additional set of subject content objects (e.g., from earlier onboarded content objects) or from a re-application of a clustering technique (e.g., a different clustering technique, the same clustering technique with different constraints, etc.).

When no further feature clusters are to be formed ("No" path of decision 410), the then-current set of feature clusters are assigned identifiers to identify each respective feature cluster (step 412). As shown, feature clusters $324_2$ are assigned respective identifiers (e.g., "$FC_1$", "$FC_2$", "$FC_3$", and "$FC_4$") to facilitate various processes that use the feature cluster information.

One such process that uses the feature cluster information pertains to defining document clusters and document templates (step 216 and step 218 of FIG. 2), as disclosed as follows.

Figure 5:
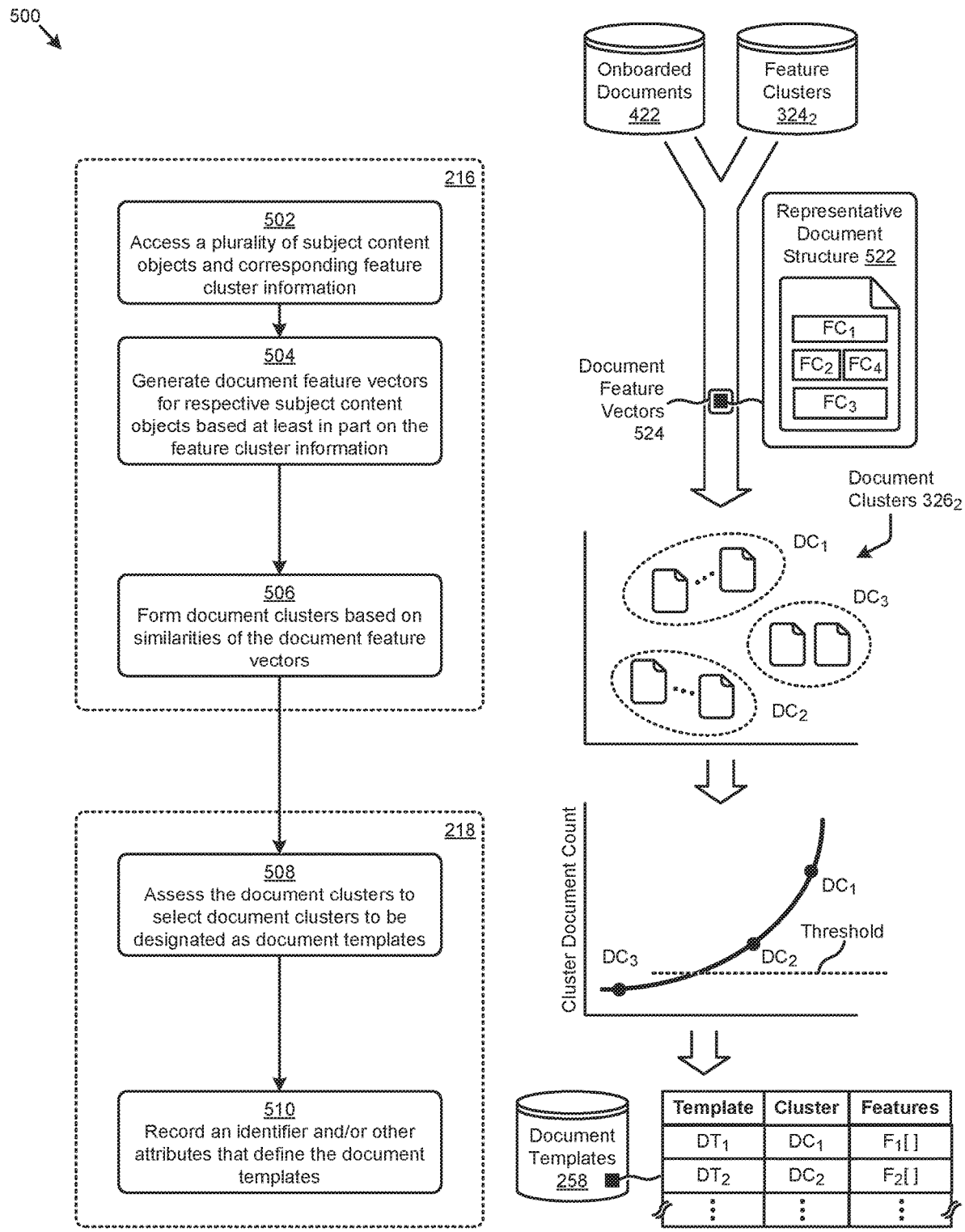
FIG. 5 depicts a content object clustering technique as implemented in systems for automatic form and template detection.

FIG. 5 depicts a content object clustering technique 500 as implemented in systems for automatic form and template detection. As an option, one or more variations of content object clustering technique 500 or any aspect thereof may be implemented in the context of the architecture and functionality of the embodiments described herein and/or in any in any environment.

FIG. 5 illustrates aspects pertaining to analyzing the features of incoming content objects to match to machine-learned features that define a document template. Specifically, the figures are presented to illustrate one embodiment of certain steps and/or operations that facilitate using feature cluster information to define document clusters and document templates. As depicted in the figures, the steps and/or operations are associated with step 216 and step 218 of FIG. 2. A representative scenario is also shown in the figures to illustrate an example application of content object clustering technique 500.

Content object clustering technique 500 commences by accessing a plurality of subject content objects and a set of associated feature cluster information (step 502). As illustrated, for example, onboarded documents 422 and associated feature clusters $324_2$ might be accessed. Document feature vectors for respective constituents of the subject content objects are generated based at least in part on the feature cluster information (step 504). As can be observed, a set of document feature vectors 524 that correspond to onboarded documents 422 are generated in the illustrative example.

The feature cluster information is included in the document feature vectors as vector attributes. Specifically, a particular document feature vector for a particular content object can include information (e.g., identifier, content, etc.) about the feature clusters associated with the content object, the proximity and/or arrangement of the underlying features that correspond to the feature clusters, etc. For example, and as depicted by representative document structure 522, the represented content object has at least four features that correspond to feature clusters $FC_1$, $FC_2$, $FC_3$, and $FC_4$. In this case, the document feature vector associated with the content object may include information describing the four feature clusters, their arrangement, and/or other information.

Step 506 serves to form document clusters based on similarities of the document feature vectors 524. Strictly as one example, one possible approach having a complexity of order 1 is to identify similarities between document feature vectors by using a hashing function to bin document feature vectors having the same characteristics into the same hash bin. In some cases a locality sensitive hashing (LSH) algorithm can be used. A measure of the similarity over the document feature vectors is calculated to form document clusters that comprise one or more of the subject content objects (step 506). For example, a set of document clusters $326_2$ (e.g., identified as $DC_1$, $DC_2$, and $DC_3$) are formed from document feature vectors 524. Any known machine learning techniques and/or clustering techniques can be applied to the document feature vectors to form the document clusters.

The document clusters formed from the subject content objects are assessed to select document clusters to be designated as document templates (step 508). Various techniques can be applied to select the document clusters to be designated as document templates. As illustrated, one such technique examines the cluster document count to determine if a certain document cluster is to be designated as a document template. If the cluster document count for the document cluster is above a predefined threshold (e.g., "Threshold"), then the document cluster is designated as a document template. If the cluster document count for the document cluster is below a predefined threshold, then the document cluster is not designated as a document template. As more content objects are onboarded and associated with a particular document cluster, the cluster document count may then exceed the threshold and be designated a document template. In the example scenario, document cluster $DC_1$ and document cluster $DC_2$ surpass the threshold and are selected to be document templates, whereas document cluster $DC_3$ is below the threshold and is not selected to be a document template.

For each document template, a document template identifier and/or other attributes are recorded (step 510). For example, a data structure as shown might be established to record a document template identifier (e.g., $DT_1$, $DT_2$, etc.) and a set of associated attributes in document templates 258. The document template attributes might include a document cluster identifier (e.g., $DC_1$, $DC_2$, etc.) and certain template structural attributes (e.g., stored in a data object $F_1[\ ]$, $F_2[\ ]$, etc.) that describe the features (e.g., feature type as indicated by a feature cluster identifier, etc.), feature arrangements (e.g., feature coordinates, sequences, proximities, etc.), and/or other characteristics of the template.

The document templates that result from content object clustering technique 500 facilitate techniques for classifying content objects and populating their metadata (step 232 and step 234 of FIG. 2), which techniques are disclosed in further detail as follows.

Figure 6:
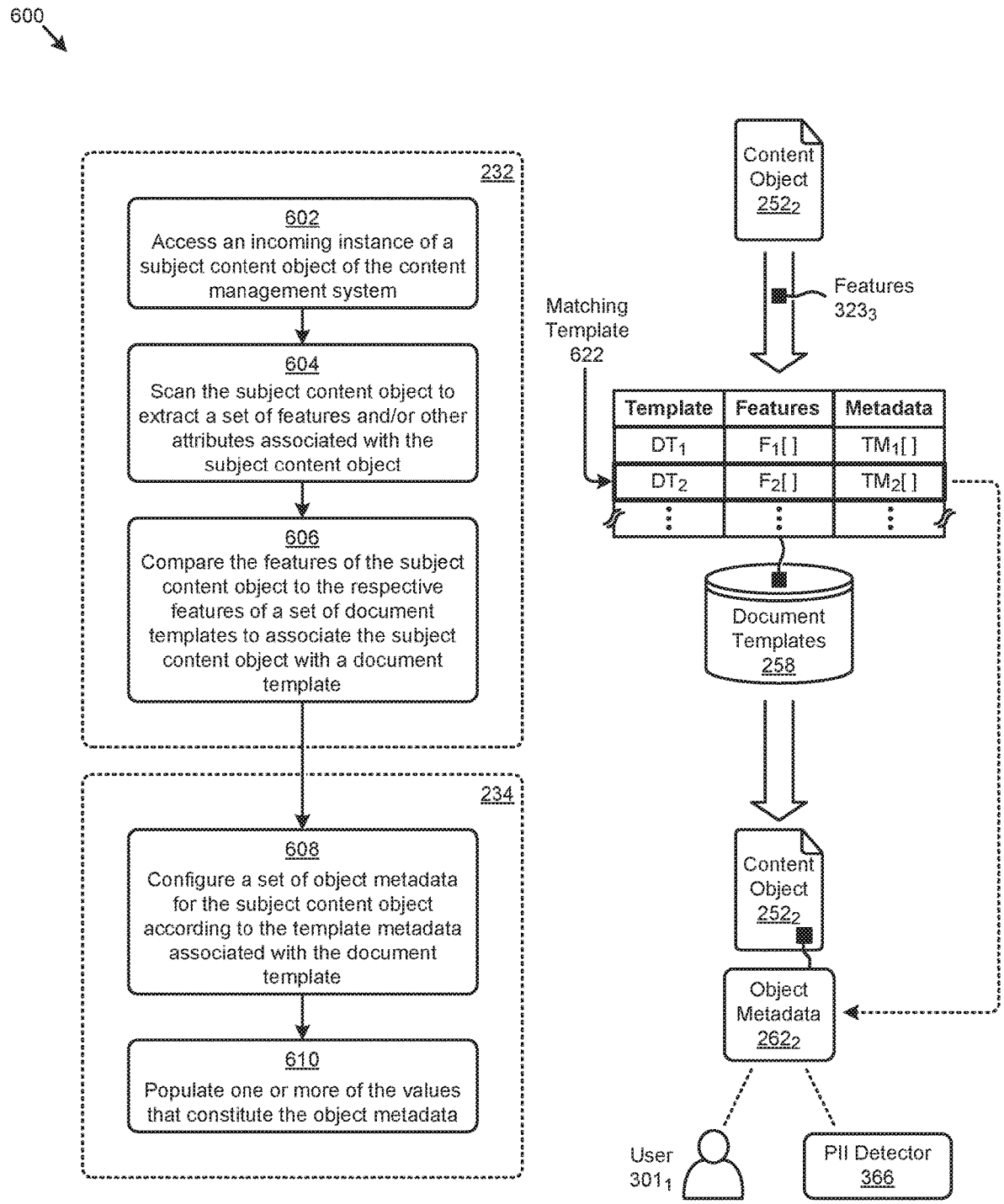
FIG. 6 depicts a single content object classification technique as implemented in systems that assign metadata to content objects based on their structural correspondence to machine-learned document templates.

FIG. 6 depicts a single content object classification technique 600 as implemented in systems that assign metadata to content objects based on their structural correspondence to machine-learned document templates. As an option, one or more variations of single content object classification technique 600 or any aspect thereof may be implemented in the context of the architecture and functionality of the embodiments described herein and/or in any in any environment.

FIG. 6 illustrates aspects pertaining to analyzing the features of incoming content objects to match to machine-learned features that define a document template. Specifically, the figure is presented to illustrate one embodiment of certain steps and/or operations that classify content objects as associated with respective document templates that are defined by the herein disclosed techniques, and efficiently populate the metadata of the content objects. As depicted in FIG. 6, the steps and/or operations are associated with step 232 and step 234 of FIG. 2. A representative scenario is also shown in FIG. 6 to illustrate an example application of single content object classification technique 600.

Single content object classification technique 600 commences by accessing an incoming instance of a subject content object that is being onboarded into the content management system (step 602). As illustrated, for example, a content object $252_2$ might be a recently onboarded or created document in the content management system. The subject content object is scanned to extract a set of features and/or other attributes associated with the subject content object (step 604). As can be observed, a set of features $323_3$ are extracted from content object $252_2$. As earlier described, various techniques can be applied to extract features from content objects.

The features of the subject content objects are compared to the respective features of a set of document templates to match the subject content object to a particular document template (step 606). As can be observed, features $323_3$ might be compared to respective sets of features (e.g., as defined in data objects $F_1[\ ]$, $F_2[\ ]$, etc.) associated with a set of document templates 258 defined by the herein disclosed techniques. Such comparisons may, for example, determine a matching score based at least in part on the number of matching features, the location of the features (e.g., absolute or relative), and/or other metrics. Highly structured documents, such as forms, could achieve a high matching score, whereas less structured documents may exhibit matching score limitations. Certain thresholds may be established to determine when a score indicates a match to a document template. For the illustrative scenario, a matching template 622 (e.g., document template $DT_2$) is identified for content object $252_2$.

When a document template is associated with the subject content object, a set of object metadata is configured for the subject content object according to the template metadata associated with the document template (step 608). As can be observed, a set of object metadata $262_2$ is configured for content object $252_2$ in accordance with template metadata $TM_2[\ ]$ associated with matching template 622. One or more values of the object metadata are then populated (step 610). For example, certain metadata values can be manually entered and/or updated by a system administrator (e.g., user $301_1$) and/or automatically populated by one or more components (e.g., PII detector 366). of the content management system. In some cases, the values of the object metadata correspond to policies and/or rules. In some cases, the values of the object metadata correspond to metadata in one or more user profiles. More particularly, upon discovery of some feature of a content object can be used to inform policies and/or rules that correspond to user profiles of users who have been granted or denied access to a particular subject content object. The discovery of any feature of a content object can be used as an input to automatically assign metadata and metadata values to other content objects or to other user profiles. Strictly as one example, if a subject content object has been deemed to contain sensitive or confidential information, then a security label such as "Confidential" or "Sensitive" might be propagated to metadata of its containing folder, and/or might be propagated to metadata of other content objects that are then-present in the same folder as the subject document.

Additional Embodiments of the Disclosure

Instruction Code Examples

Figure 7A:
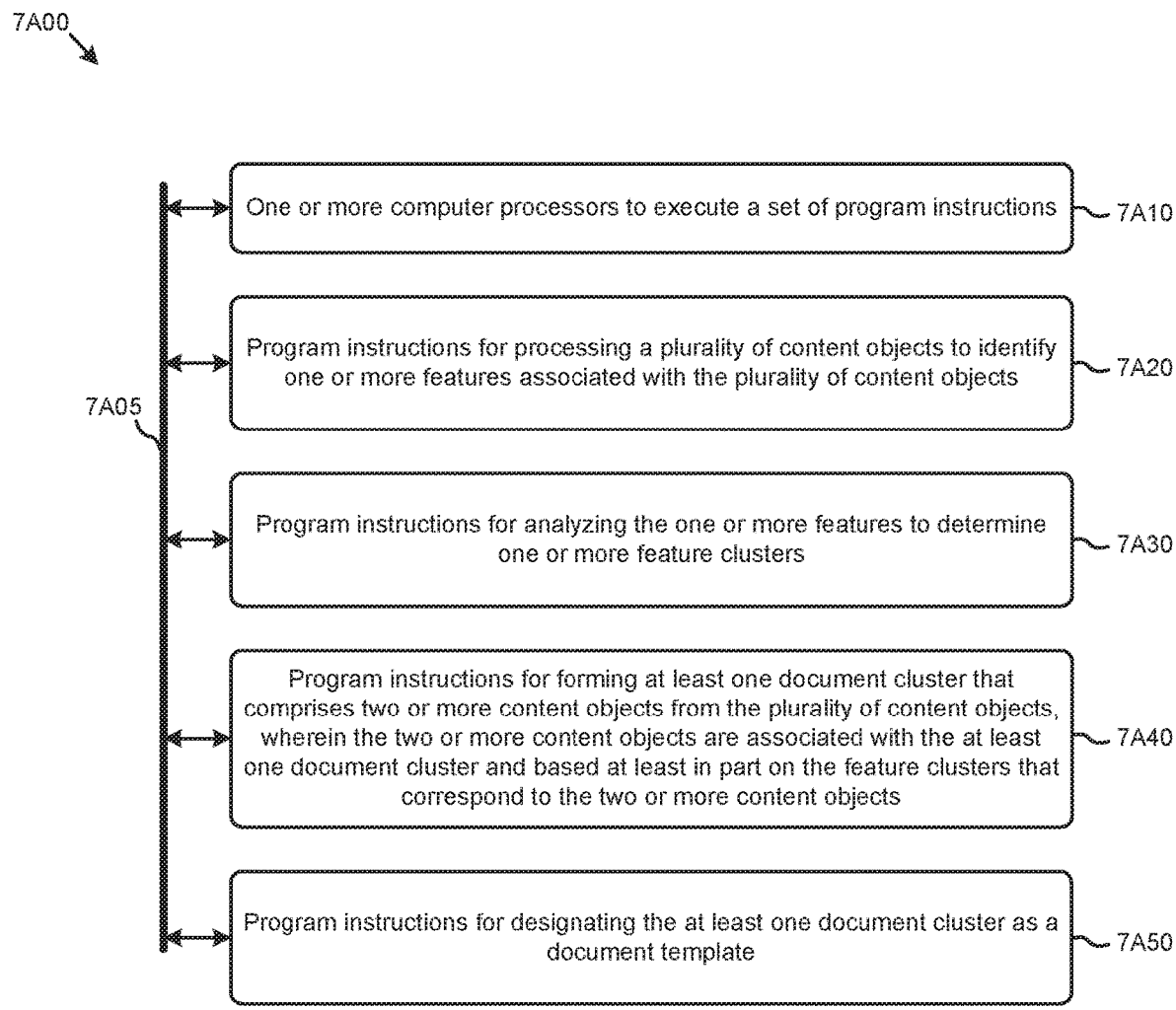
FIG. 7A, FIG. 7B, and FIG. 7C depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address classifying content objects as corresponding to a particular machine-learned document template. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system.

As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: processing a plurality of content objects to identify one or more features associated with the plurality of content objects (module 7A20); analyzing the one or more features to determine one or more feature clusters (module 7A30); forming at least one document cluster that comprises two or more content objects from the plurality of content objects, wherein the two or more content objects are associated with the at least one document cluster and based at least in part on the feature clusters that correspond to the two or more content objects (module 7A40); and designating the at least one document cluster as a document template (module 7A50).

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

Figure 7B:
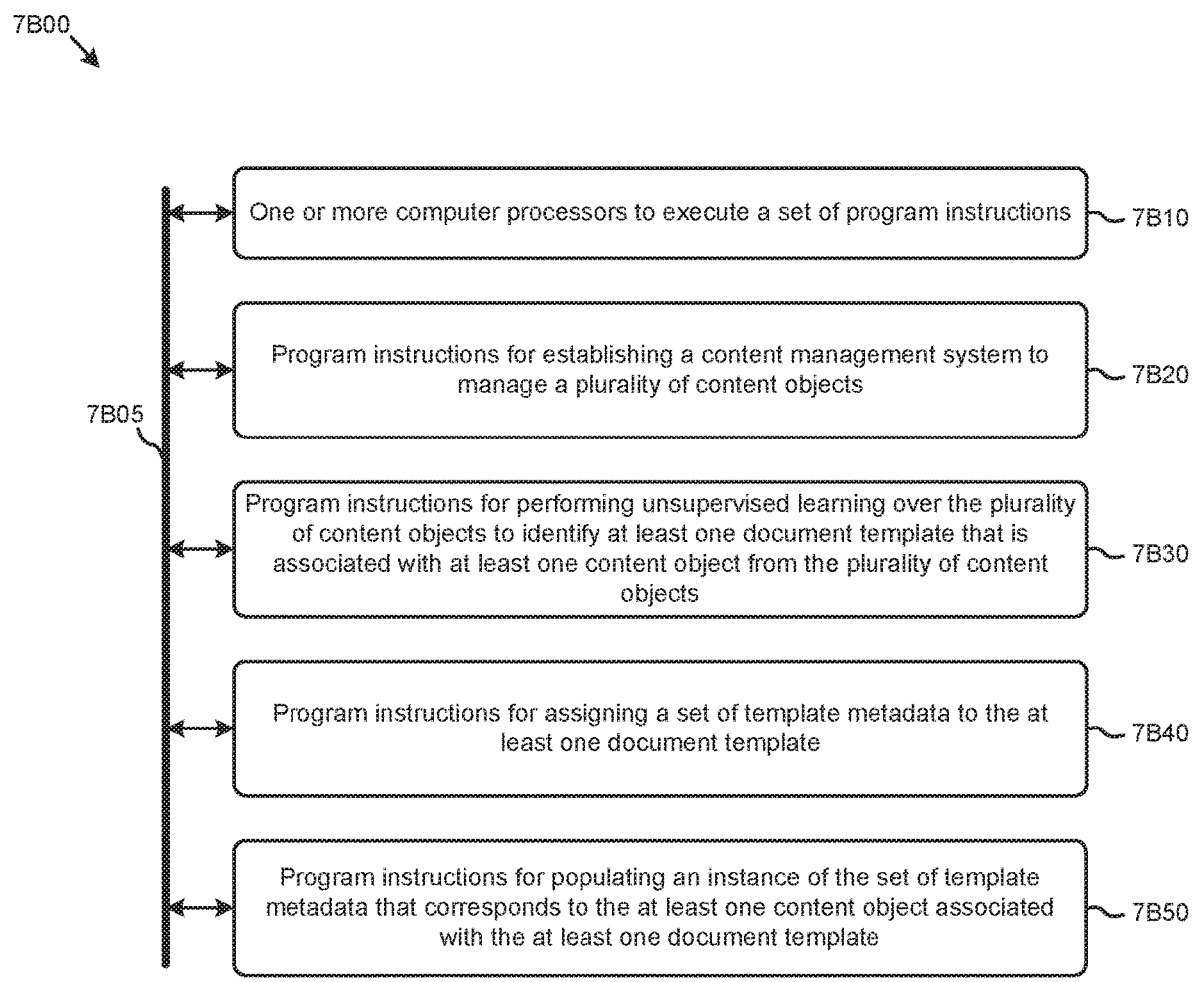

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: establishing a content management system to manage a plurality of content objects (module 7B20); performing unsupervised learning over the plurality of content objects to identify at least one document template that is associated with at least one content object from the plurality of content objects (module 7B30); assigning a set of template metadata to the at least one document template (module 7B40); and populating an instance of the set of template metadata that corresponds to the at least one content object associated with the at least one document template (module 7B50).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7C:
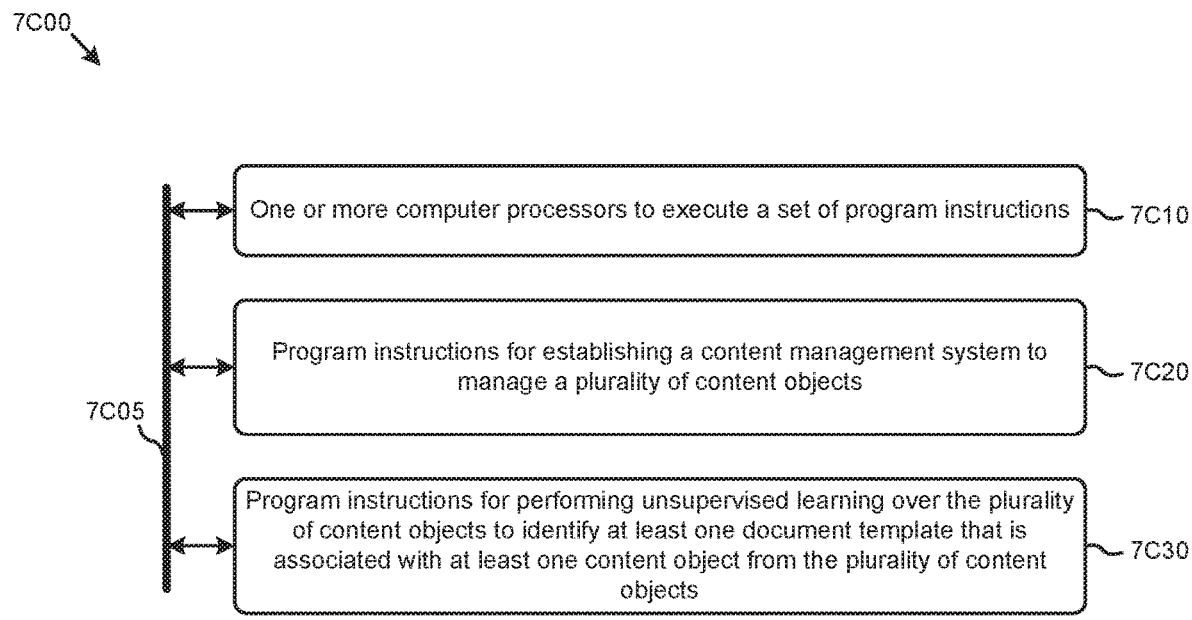

FIG. 7C depicts a system 7C00 as an arrangement of computing modules that are interconnected so as to operate cooperatively to implement certain of the herein-disclosed embodiments. The partitioning of system 7C00 is merely illustrative and other partitions are possible. As an option, the system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with any other operations over communication path 7C05. The modules of the system can, individually or in combination, perform method operations within system 7C00. Any operations performed within system 7C00 may be performed in any order unless as may be specified in the claims. The shown embodiment implements a portion of a computer system, presented as system 7C00, comprising one or more computer processors to execute a set of program code instructions (module 7C10) and modules for accessing memory to hold program code instructions to perform: establishing a content management system to manage a plurality of content objects (module 7C20); performing unsupervised learning over the plurality of content objects to identify at least one document template that is associated with at least one content object from the plurality of content objects (module 7C30).

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations. Strictly as an example, one method for identifying a document as corresponding to a template includes maintaining a dataset of content objects and operations or activities performed over the content objects. The dataset can be accessed by an computing modules that operate cooperatively to perform unsupervised learning over the plurality of content objects to identify whether or not, and/or to calculate a probability or likelihood value that a particular document is deemed to be a document template. The dataset serves to associate content objects with users and users with events, as well as the nature and time of the events that occur over the content objects. Moreover, the dataset may be configured to maintain a time-organized history of events that were observed as having been taken over the content objects.

The foregoing unsupervised learning relies, at least in part, on computing modules that form vectors. In this and other embodiments, the vectors comprise features of sequences of events taken from the history of events. Some embodiments add additional features to the vectors based at least in part on aspects of a sequence corresponding to the at least two events. For example, a first event might correspond to a sharing event (e.g., sharing a file with a large number of collabbed-in users), whereas a second through Nth event might correspond to users (e.g., collabbed-in users) making a copy of the file and adding information to the copy. In one embodiment, the unsupervised machine learning might deem that the foregoing sequence of events taken by the multiple users over the originally-shared document to be highly indicative that the originally-shared document is a document template to which the multiple users add information (e.g., likely corresponding to filling in field values of a form). The quality of results of such unsupervised machine learning can be enhanced by applying any one or more known-in-the-art machine learning techniques over the vectors and/or using the additional features of the vectors in determining whether or not the document is a template.

As heretofore mentioned, there can be many additional features added to the vectors, and the additional features can be considered in some situations to be signals that are input into a classifier. Strictly as examples, such signals might correspond to a user role, and/or an environmental characteristic, and/or an environmental condition, and/or a folder name, and/or an identification or pathname of a content object corresponding to the least two events, and/or permissions associated with the content object corresponding to the least two events, and/or policies associated with the content object corresponding to the least two events, and/or metadata of the content object corresponding to the least two events, and/or extracted features of the content object corresponding to the least two events. In some situations the extracted features of the content object corresponds to personally-identifiable information. For example, if the document were indeed a form or template to be filled in by a respondent, then it might be that at least one field of the form or template would correspond to some form of personally-identifiable information (e.g., a name or a social security number, etc.). As such, the dataset with the history of events would contain many "content object save" events corresponding to when a user saved their instance of the template or form. The precision and recall of a classifier that uses aspects of the foregoing events can be improved by identifying a sequence of events that correspond to (1) a sharing event raised by an initiating user followed by (2) an access event raised by a receiving user, followed by (3) a save event raised by receiving user.

Aspects of the environment(s) surrounding the user(s) and/or the content objects can be used in increase the precision and recall of a classifier. As examples, when performing unsupervised learning, the determination that the at least one of the plurality of content objects is a template can be based at least in part on one or more or combinations of environmental attribute that pertain to a user or a content object. Examples of such environmental attributes include pathnames, permission settings, and collaboration groups. Furthermore, aspects of sequences of events taken from the history of events can be used in increase the precision and recall of a classifier. Strictly as an example, one sequence of events might correspond to a time-ordered progression from a first state to a second state. Moreover the specific relationship between an earlier first state and a later second state might be used as a feature in a vector or a signal into a classifier.

The results of the unsupervised learning can be applied in the content management system. For example, once a document has been deemed to correspond to an identified document template, then the content management system can assign a set of template metadata to the document template. Further, after a set of template metadata has been assigned or designated to correspond to the identified document template, then the content management system can populate instances of the designated template metadata into any content object that is deemed to match or otherwise be associated document template. This auto-population can be carried further, at least in that the content management system can auto-populate instances of the designated set of template metadata into one or more policies that affect document handling operations of the at least one content object.

System Architecture Overview

Additional System Architecture Examples

Figure 8A:
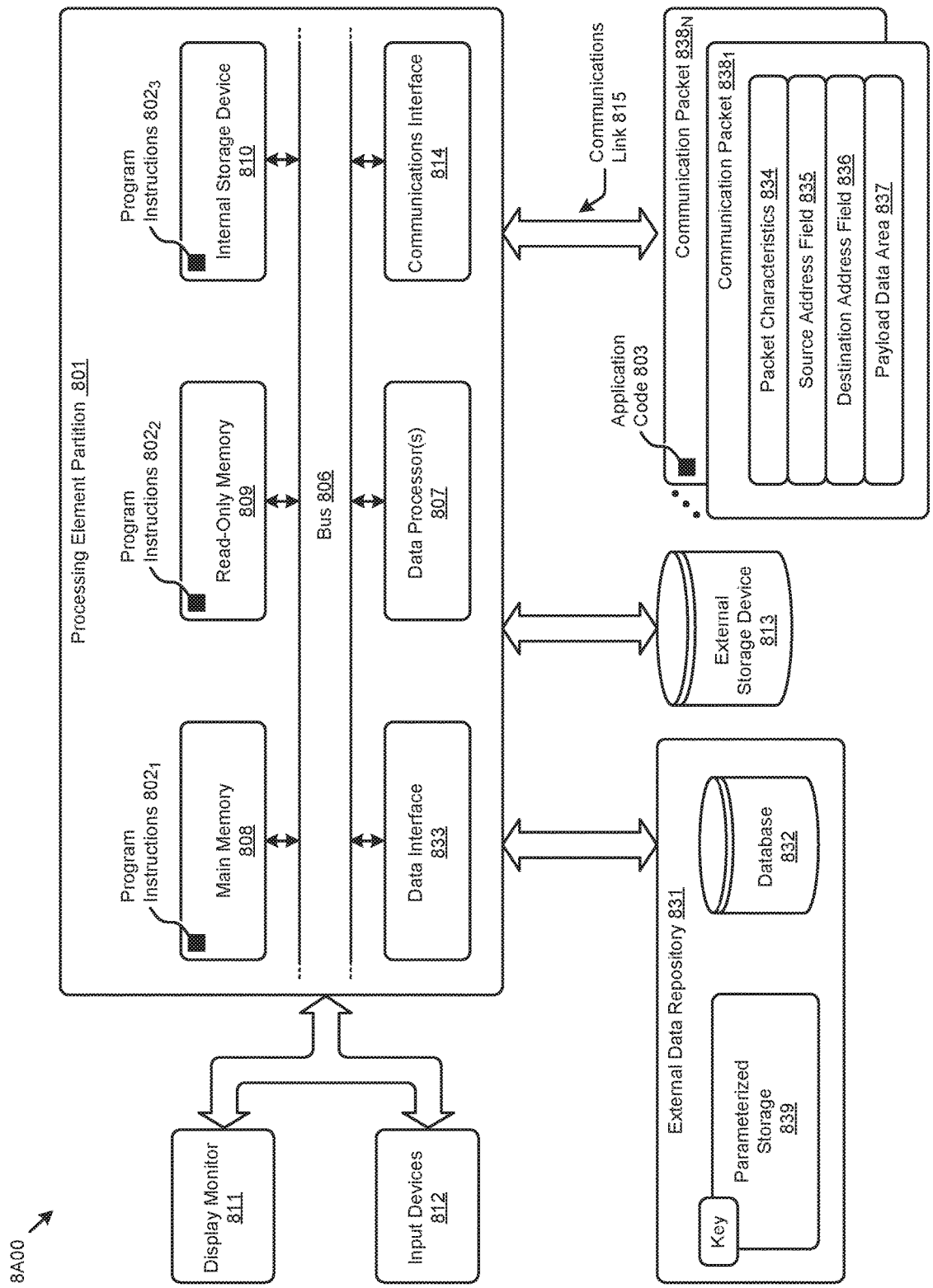
FIG. 8A and FIG. 8B present block diagrams of computer system architectures having components suitable for implementing embodiments of the present disclosure and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to form and template detection. A module may include one or more state machines and/or combinational logic used to implement or facilitate the operational and/or performance characteristics pertaining to form and template detection.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of form and template detection). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to form and template detection, and/or for improving the way data is manipulated when performing computerized operations pertaining to analyzing the features of incoming content objects to match to machine-learned features that define a document template.

Figure 8B:
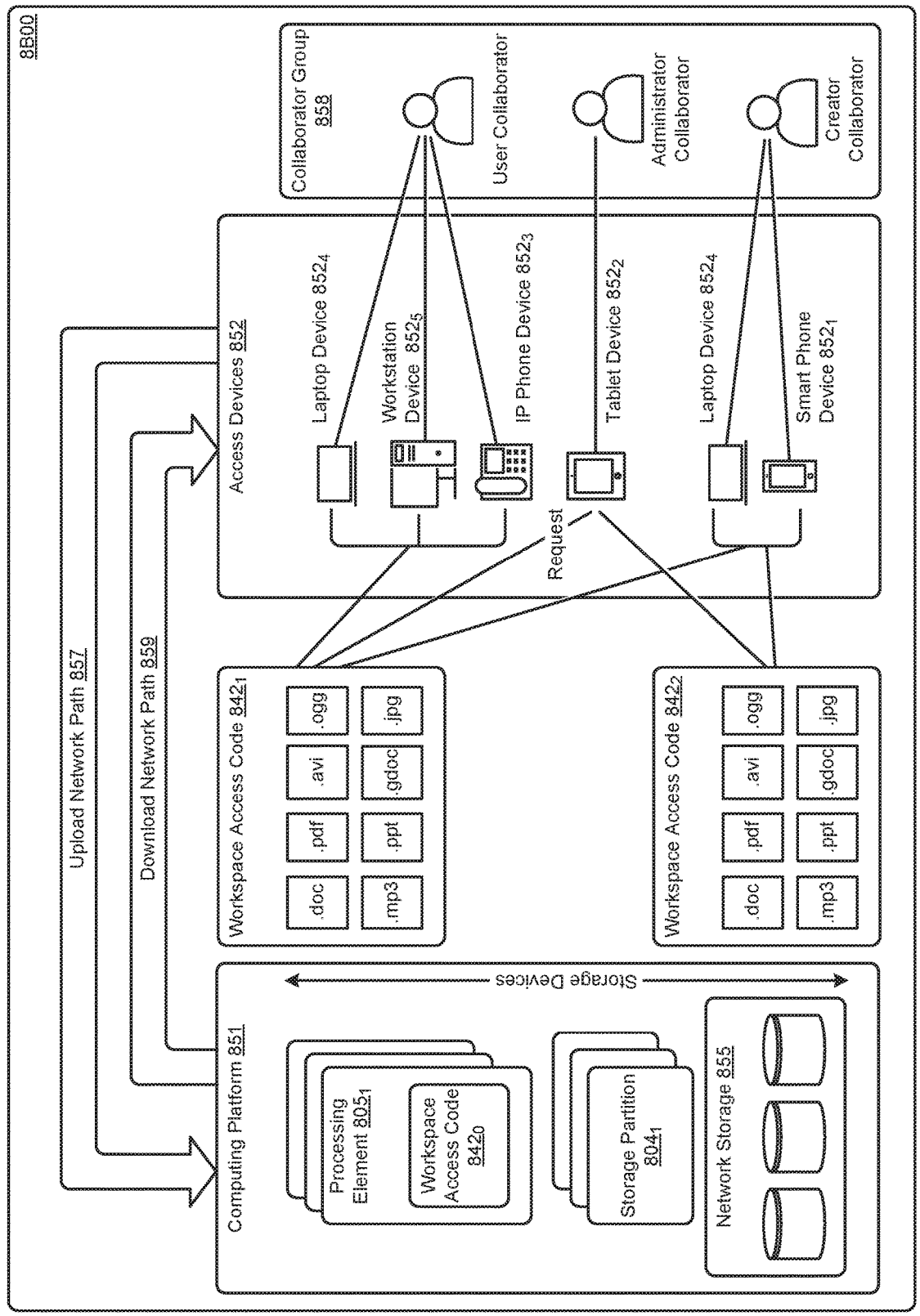

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code 842₂). Workspace access code can be executed on any of access devices 852 (e.g., laptop device 852₄, workstation device 852₅, IP phone device 852₃, tablet device 852₂, smart phone device 852₁, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element 805₁). The workspace access code can interface with storage devices such as networked storage 855. Storage of workspaces and/or any constituent files or objects, and/or any other code or scripts or data can be stored in any one or more storage partitions (e.g., storage partition 804₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for classifying a document, the method comprising:
    storing, in a computer readable medium, an association between a particular content object template and template metadata at least by:
        processing a plurality of content objects to identify one or more features associated with the plurality of content objects,
        analyzing the one or more features to determine one or more feature clusters,
        forming at least one content object cluster that comprises two or more content objects from the plurality of content objects, the two or more content objects being associated with the at least one content object cluster based at least in part on the one or more feature clusters that correspond to the two or more content objects, and
        storing, in the computer readable medium, data that correlates the at least one content object cluster to the particular content object template and the template metadata;
    after receiving a specific content object, processing the specific content object for population of metadata into the specific content object at least by:
        determining whether the specific content object is clustered into the at least one content object cluster of a plurality of content object clusters based at least in part upon a feature of the specific content object;
        in response to a determination that the specific content object is clustered to the at least one content object cluster, selecting the particular content object template from a plurality of content object templates for the specific content object and further identifying the template metadata in response to a selection of the particular content object template; and
        populating, in the computer readable medium, one or more values into the template metadata that corresponds to the particular content object template for the specific content object; and
    implementing policy enforcement for the specific content object with the metadata and the one or more values of the template metadata at least by:
        applying, using a computing system, one or more policies to the specific content object for determining one or more restrictions, wherein the one or more policies are applied based at least in part upon an object metadata value of object metadata or indicator in the object metadata; and
        implementing policy enforcement upon the specific content object based at least in part upon the one or more restrictions.

2. The method of claim 1, wherein the one or more feature clusters are determined by deriving one or more vectors from the one or more features.

3. The method of claim 1, wherein the at least one content object cluster is formed by determining one or more feature configurations that are associated with the two or more content objects.

4. The method of claim 3, wherein the one or more feature configurations are characterized by at least one of one or more feature cluster identifiers, a feature sequence, or a feature proximity.

5. The method of claim 1, further comprising:
    adding a subject content object to the at least one content object cluster for a group of collaborators to collaborate on the subject content object; and
    configuring a subset of the template metadata for the particular content object template at least by assigning the one or more values of the template metadata to the subject content object and further at least by populating the one or more values into the template metadata for the subject content object.

6. The method of claim 1, wherein the object metadata comprises information pertaining to ownership corresponding to the specific content object, the one or more restrictions comprise a distribution restriction on the specific content object, and the plurality of content objects comprises one or more forms.

7. The method of claim 1, further comprising:
    determining the particular content object template based at least in part upon a plurality of attributes of the one or more features, the plurality of content object clusters, and one or more metrics, wherein the one or more metrics comprise at least one of a feature count, a sequence, or proximity.

8. The method of claim 1, further comprising performing unsupervised learning over the plurality of content objects to identify at least one document feature that is used to determine that a document corresponds to the particular content object template, wherein the particular content object template is labeled as a form.

9. A non-transitory computer readable medium having stored thereon a sequence of instructions which, when stored in memory and executed by one or more processors causes the one or more processors to perform a set of acts for classifying a document, the set of acts comprising:
   storing, in a computer readable medium, an association between a particular content object template and template metadata at least by:
      processing a plurality of content objects to identify one or more features associated with the plurality of content objects,
      analyzing the one or more features to determine one or more feature clusters,
      forming at least one content object cluster that comprises two or more content objects from the plurality of content objects, the two or more content objects being associated with the at least one content object cluster based at least in part on the one or more feature clusters that correspond to the two or more content objects, and
      storing, in the computer readable medium, data that correlates the at least one content object cluster to the particular content object template and the template metadata;
   after receiving a specific content object, processing the specific content object for population of metadata into the specific content object at least by:
      determining whether the specific content object is clustered into the at least one content object cluster of a plurality of content object clusters based at least in part upon a feature of the specific content object;
      in response to a determination that the specific content object is clustered to the at least one content object cluster, selecting the particular content object template from a plurality of content object templates for the specific content object and further identifying the template metadata in response to a selection of the particular content object template; and
      populating, in the computer readable medium, one or more values into the template metadata that corresponds to the particular content object template for the specific content object; and
   implementing policy enforcement for the specific content object with the metadata and the one or more values of the template metadata at least by:
      applying, using a computing system, one or more policies to the specific content object for determining one or more restrictions, wherein the one or more policies are applied based at least in part upon an object metadata value of object metadata or indicator in the object metadata; and
      implementing policy enforcement upon the specific content object based at least in part upon the one or more restrictions.

10. The non-transitory computer readable medium of claim 9, wherein the one or more feature clusters are determined by deriving one or more vectors from the one or more features.

11. The non-transitory computer readable medium of claim 9, wherein the at least one content object cluster is formed by determining one or more feature configurations that are associated with the two or more content objects.

12. The non-transitory computer readable medium of claim 11, wherein the one or more feature configurations are characterized by at least one of one or more feature cluster identifiers, a feature sequence, or a feature proximity.

13. The non-transitory computer readable medium of claim 9, wherein the plurality of content objects comprises one or more forms.

14. The non-transitory computer readable medium of claim 9, the set of acts further comprising:
   determining the particular content object template based at least in part upon a plurality of attributes of the one or more features, the plurality of content object clusters, and one or more metrics, wherein the one or more metrics comprise at least one of a feature count, a sequence, or proximity.

15. The non-transitory computer readable medium of claim 9, further comprising performing unsupervised learning over the plurality of content objects to identify at least one document feature that is used to determine that a document corresponds to the particular content object template.

16. A system for classifying a document, the system comprising:
   a non-transitory storage medium having stored thereon a sequence of instructions; and
   one or more processors that execute the sequence of instructions to cause the one or more processors to perform a set of acts, the set of acts comprising:
      storing, in a computer readable medium, an association between a particular content object template and template metadata at least by:
         processing a plurality of content objects to identify one or more features associated with the plurality of content objects,
         analyzing the one or more features to determine one or more feature clusters,
         forming at least one content object cluster that comprises two or more content objects from the plurality of content objects, the two or more content objects being associated with the at least one content object cluster based at least in part on the one or more feature clusters that correspond to the two or more content objects, and
         storing, in the computer readable medium, data that correlates the at least one content object cluster to the particular content object template and the template metadata;
      after receiving a specific content object, processing the specific content object for population of metadata into the specific content object at least by:
         determining whether the specific content object is clustered into the at least one content object cluster of a plurality of content object clusters based at least in part upon a feature of the specific content object;
         in response to a determination that the specific content object is clustered to the at least one content object cluster, selecting the particular content object template from a plurality of content object templates for the specific content object and further identifying the template metadata in response to a selection of the particular content object template; and
         populating, in the computer readable medium, one or more values into the template metadata that corresponds to the particular content object template for the specific content object; and implementing policy enforcement for the specific content object with the metadata and the one or more values of the template metadata at least by:

applying, using a computing system, one or more policies to for the specific content object for determining one or more restrictions, wherein the one or more policies are applied based at least in part upon an object metadata value of object metadata or indicator in the object metadata; and implementing policy enforcement upon the specific content object.

17. The system of claim 16, wherein the one or more feature clusters are determined by deriving one or more vectors from the one or more features.

18. The system of claim 16, wherein the at least one content object cluster is formed by determining one or more feature configurations that are associated with the two or more content objects.

19. The system of claim 18, wherein the one or more feature configurations are characterized by at least one of one or more feature cluster identifiers, a feature sequence, or a feature proximity.

20. The system of claim 16, further comprising performing unsupervised learning over the plurality of content objects to identify at least one document feature that is used to determine that a document corresponds to the particular content object template.

\* \* \* \* \*